United States Patent
Buck

(10) Patent No.: US 10,040,244 B2
(45) Date of Patent: Aug. 7, 2018

(54) METHOD FOR FILLING A JOINT WITH AN ADHESIVE AND/OR SEALING MATERIAL AND SYSTEM FOR FILLING A JOINT WITH AN ADHESIVE AND/OR SEALING MATERIAL

(71) Applicant: SIKA TECHNOLOGY AG, Baar (CH)

(72) Inventor: Manuel Buck, Gebenstorf (CH)

(73) Assignee: SIKA TECHNOLOGY AG, Baar (CH)

( * ) Notice: Subject to any disclaimer, the term of this patent is extended or adjusted under 35 U.S.C. 154(b) by 85 days.

(21) Appl. No.: 14/910,127

(22) PCT Filed: Aug. 14, 2014

(86) PCT No.: PCT/EP2014/067398
§ 371 (c)(1),
(2) Date: Feb. 4, 2016

(87) PCT Pub. No.: WO2015/022391
PCT Pub. Date: Feb. 19, 2015

(65) Prior Publication Data
US 2016/0176104 A1 Jun. 23, 2016

(30) Foreign Application Priority Data
Aug. 14, 2013 (EP) .................................. 13180458

(51) Int. Cl.
*B29C 65/00* (2006.01)
*B29C 65/54* (2006.01)
(Continued)

(52) U.S. Cl.
CPC .............. *B29C 65/54* (2013.01); *B29C 65/70* (2013.01); *B29C 66/83* (2013.01); *E06B 3/54* (2013.01);
(Continued)

(58) Field of Classification Search
CPC ..... B29C 65/54; B29C 65/542; E06B 3/5409; E06B 3/56
See application file for complete search history.

(56) References Cited

U.S. PATENT DOCUMENTS 3,349,971 A * 10/1967 Poletajev ............. A41D 27/245
222/191
4,512,125 A * 4/1985 Eriksson ............... E06B 3/5409
52/204.591
(Continued)

FOREIGN PATENT DOCUMENTS

CN         1505725 A    6/2004
DE  20 2010 002 821 U1  6/2010
(Continued)

OTHER PUBLICATIONS

International Search Report (PCT/ISA/210) dated Sep. 4, 2014, by the Japanese Patent Office as the International Searching Authority for International Application No. PCT/EP2014/067398.
(Continued)

*Primary Examiner* — Mark A Osele
(74) *Attorney, Agent, or Firm* — Oliff PLC

(57) ABSTRACT

The present disclosure relates to a method for filling a joint with an adhesive and/or sealing material. The method can include: a) positioning a first part, such as an insert, and a second part, such as a frame, so that the first and second parts form the joint; b) introducing a movable spacer into the joint; c) positioning a nozzle element over the joint; d) displacing the nozzle element along the joint such that the nozzle element strikes against the spacer and moves the latter forwards; and e) discharging the adhesive and/or sealing material out of an exit nozzle of the nozzle element during step d).

11 Claims, 2 Drawing Sheets

(51) Int. Cl.
*B29C 65/70* (2006.01)
*E06B 3/54* (2006.01)
*E06B 3/56* (2006.01)
*B29L 9/00* (2006.01)

(52) U.S. Cl.
CPC .......... *E06B 3/5409* (2013.01); *B29C 65/542* (2013.01); *B29L 2009/00* (2013.01); *E06B 3/56* (2013.01)

(56) References Cited

U.S. PATENT DOCUMENTS

| | | | | |
|---|---|---|---|---|
| 4,826,547 | A * | 5/1989 | Lenhardt | E06B 3/67343 118/108 |
| 6,364,979 | B1 * | 4/2002 | Grato | A47G 27/0487 156/304.7 |
| 7,950,192 | B2 * | 5/2011 | Glover | B29C 65/02 52/204.53 |
| 8,057,845 | B2 * | 11/2011 | Davis | B05C 5/0216 118/323 |
| 2004/0140037 | A1 | 7/2004 | Kitzmuller et al. | |
| 2010/0239705 | A1 * | 9/2010 | Jorstad | B05C 17/00506 425/461 |
| 2016/0060950 | A1 * | 3/2016 | Mader | E06B 3/67347 156/109 |

FOREIGN PATENT DOCUMENTS

| | | | | |
|---|---|---|---|---|
| EP | 1690906 A1 * | 8/2006 | ............ | B29C 65/54 |
| EP | 2363564 A2 | 9/2011 | | |
| EP | 2565347 A1 * | 3/2013 | .......... | E06B 5/0216 |
| EP | 3078799 A1 * | 10/2016 | .......... | E06B 3/5409 |
| WO | WO 97/03270 A1 | 1/1997 | | |
| WO | WO 2012/001005 A1 | 1/2012 | | |

OTHER PUBLICATIONS

Written Opinion (PCT/ISA/237) dated Sep. 4, 2014, by the Japanese Patent Office as the International Searching Authority for International Application No. PCT/EP2014/067398.

Notification of Transmittal of Translation of the International Preliminary Report on Patentability (Forms PCT/IB/338 and PCT/IB/373) and the Written Opinion of the International Searching Authority (Form PCT/ISA/237) dated Feb. 25, 2016, by the International Bureau of WIPO in corresponding International Application No. PCT/EP2014/067398. (7 pages).

Office Action (Notification of the First Office Action) dated Nov. 30, 2016, by the Chinese Patent Office in corresponding Chinese Patent Application No. 201480044454.7, and an English Translation of the Office Action. (10 pages).

* cited by examiner

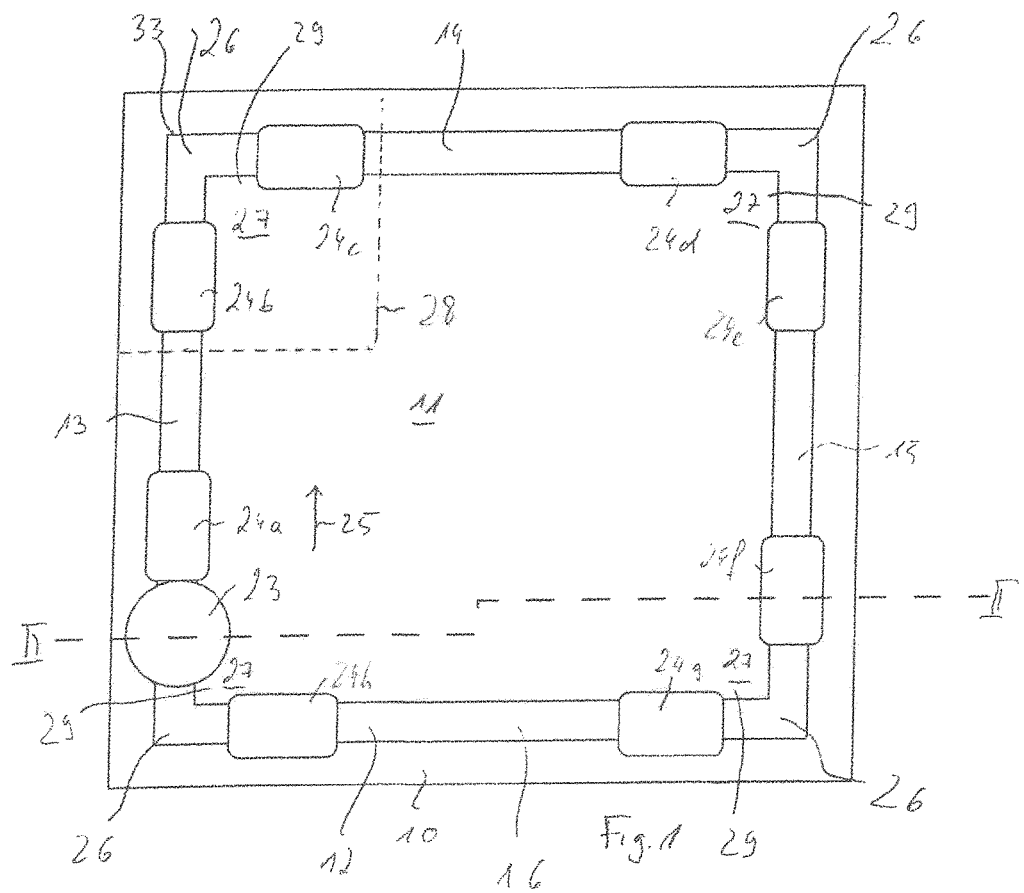
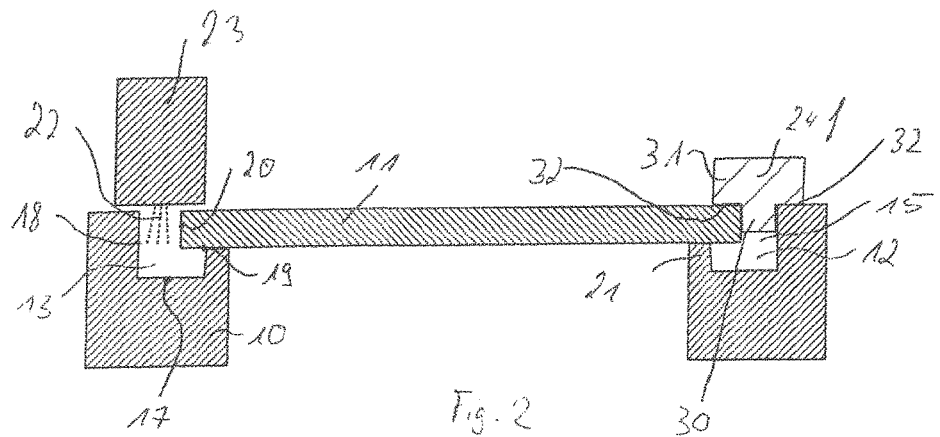

METHOD FOR FILLING A JOINT WITH AN ADHESIVE AND/OR SEALING MATERIAL AND SYSTEM FOR FILLING A JOINT WITH AN ADHESIVE AND/OR SEALING MATERIAL

TECHNICAL FIELD

The invention relates to a method for filling a joint with an adhesive and/or a sealant, to the use of a spacer, to a system for filling a joint with a sealant and/or adhesive, and to a spacer.

PRIOR ART

Devices for filling a joint with an adhesive and/or sealant are known from the prior art.

Document WO 97/03270 A1 describes a spacer for the positioning of a glass. The spacer has at least one circular protuberance on at least one end section in order to space the window glass apart from a window profile in a smooth manner when the spacer is inserted.

DE 20 2010 002 821 U1 has disclosed an adhesive nozzle for an adhesive machine. A main body of the adhesive nozzle has, on one end thereof, an elongate adhesive outlet. An adhesive nozzle hollow body is, at one side, that is to say in the region of the adhesive outlet, in the form of a flat, plate-like element, and has, at its other end, an approximately square enlargement. The adhesive outlet extends over a major part of the front face surface of the plate-like element. A thickness of the plate-like element corresponds to an adhesive nozzle. Overall, the plate-like element of the nozzle is inserted into the joint.

It is for example known for an insert to be positioned, with the aid of centering elements, in a frame which is to be adhesively bonded or sealed off. It is possible for a centering element of this type (which also serves as a spacer) to be replaced with an adhesive strip. A further possibility for the positioning of an insert in a frame is described in WO 2012/001005 A1.

By means of so-called hollow "lost blocks", an insert is aligned in a frame and held in a particular position. The blocks remain in the joint even after the filling of the joint with an adhesive or sealant.

In this context, it is considered to be disadvantageous that a large number of centering elements must be used in order to achieve satisfactory filling of the joint. This is because, between two centering elements (spacers), an intermediate space remains, which is larger the fewer centering elements are used. Within said intermediate space, the joint is not clearly defined. Depending on the material of the frame and/or insert, the joint itself may have great fluctuations in thickness over short sections. In the prior art, this can be eliminated (or reduced) basically only through the provision of further centering elements. In the prior art, therefore, it is a basic problem that either great outlay is necessary (use of a multiplicity of centering elements) or considerable losses in quality of the joint filling must be accepted.

It is an object of the invention to propose a method and a system for filling a joint with an adhesive and/or sealant, in the case of which, with little outlay, it is possible to achieve satisfactory (constant) filling of a joint. It is also sought to propose a spacer and the use of a spacer.

PRESENTATION OF THE INVENTION

Said object is achieved by way of a method, the use, a system and a spacer.

In particular, the object is achieved by way of a method for filling a joint with an adhesive and/or sealant, comprising the steps:

a) positioning a first part, in particular an insert, and a second part, in particular a frame, such that the first and second parts form a joint;
b) inserting a movable spacer into the joint;
c) positioning a nozzle element over the joint;
d) displacing the nozzle element along the joint such that the nozzle element abuts against the spacer and moves the latter forward; and
e) discharging adhesive out of an outlet opening of the nozzle element during step d).

A core concept of the invention lies in the provision of a movable spacer which is moved forward by way of a likewise movable nozzle element. The nozzle element thus slides the spacer through the joint that is to be filled with an adhesive and/or sealant. It is ensured in this way that the nozzle element always introduces adhesive and/or sealant into the joint a short distance behind the moving spacer. This also means that the introduction of the adhesive or sealant always takes place in spatial proximity to a spacer. Owing to said spatial proximity, a high level of consistency of the joint width is achieved. Here, the spacer defines the joint width. Altogether, it is possible, with a small number of spaces, possibly with only one spacer, to achieve a constant filling of a joint with an adhesive and/or sealant. Thus, with one simple measure, two basically conflicting requirements, specifically firstly that of ensuring a constant filling of the joint and secondly that of reducing the outlay in terms of production, are satisfied simultaneously.

According to a general concept of the invention, at least one nozzle element and at least one spacer arranged in spatial proximity to the nozzle element are moved simultaneously through a joint. The spatial distance between nozzle element and spacer is preferably less than or equal to 5 centimeters, more preferably less than or equal to 1 centimeter. A refinement of this general concept, nozzle element and spacer can be moved forward by way of a common drive device. It is however also conceivable, for nozzle element and spacer, for a respective separate drive device to be provided, which drive devices move nozzle element and spacer forward at the same speed. In terms of a method, it is thus possible for feature d) to be generalized to the effect that nozzle element and spacer are moved at the same speed and with a small distance to one another (the distance may for example be less than or equal to 5 centimeters or, better, less than or equal to 1 centimeter or even reduced to 0).

A joint is to be understood in particular to mean an intermediate space between two adjacent parts. In the case of an insert which is to be inserted into a frame, the joint is likewise of frame-shaped or rectangular form, and forms the intermediate space between the inner edge of the frame and the outer edge of the insert. As an insert, use may be made, in particular, of a glass. The insert is preferably the cover (glass cover) for a solar collector or a photovoltaic element.

The spacer may (in the case of a joint between an insert and a frame being filled) function in particular as a centering element, which means that the spacer (if appropriate together with further spacers) defines the position of the insert within the frame. For this purpose, it is possible for multiple (movable) spacers to be provided. On the other hand, the spacer also defines the joint width, specifically in particular at a short (temporal or spatial) distance from the location at which adhesive and/or sealant is introduced via the nozzle element. The spacer may be positioned entirely in the joint. It is however preferable for the spacer to be arranged only partially within the joint, and to project partially above said joint.

The adhesive and/or sealant may be a silicon-based adhesive and/or sealant. An adhesive is to be understood preferably to mean a substance which makes it possible to realize a cohesive connection between two parts. A sealant is preferably an elastic sealant. Use may however also be made of cement and other possibly inelastic sealants.

The method is preferably used for thermal solar collectors, photovoltaic installations, partitions or windows, in particular for thermal solar collectors.

The spacer is preferably removed from the joint when a joint end or a joint corner is reached. Alternatively, it is also conceivable for the spacer to remain in the joint when a joint end or a joint corner is reached. However, if the spacer is removed when a joint end or a joint corner is reached, it is possible for the movable nozzle element to be easily moved onward without an interruption in the filling of the joint. The method is further simplified and expedited in this way.

The spacer preferably has a run-on bevel such that said spacer is lifted out when it abuts against a joint and/or a joint corner. Alternatively or in addition, a run-on bevel may be provided at a joint end or at a joint corner such that the spacer is lifted out when it runs against the run-on bevel of the joint end or of the joint corner. A run-on bevel on a joint end or a joint corner may be realized for example by virtue of the joint having (on its base) a ramp. It is preferable for the spacer to have a run-on bevel. Said run-on bevel may for example be realized by way of a convex section (on the underside) of the spacer. In general, a run-on bevel of the spacer is provided on the underside. Here, the underside is intended to be that side of the spacer which points in the direction of the joint. In a specific embodiment, the run-on bevel of the spacer is formed by a convex rib. Said convex rib is preferably also that section of the spacer which is situated within the joint and which ultimately defines the joint width.

In a specific embodiment, multiple (movable) spacers are provided which are introduced into the joint. The positioning of the two parts that form the joint can be further improved in this way. Here, it is particularly preferable if multiple spacers (for example two spacers) can be moved forward simultaneously by the nozzle element. The nozzle element can thus collect multiple spacers simultaneously such that said spacers can be removed (for example at a joint end or a joint corner). A simple and nevertheless fast method is realized in this way.

The joint may comprise multiple joint segments which have an angle (for example greater than 10 degrees, in particular of 90 degrees) with respect to one another. It is preferable for at least one movable spacer to be inserted into each of the joint segments. Exact positioning of the first and second parts is realized in a simple manner in this way. In particular, if the first part is an insert (glass pane) and the second part is a frame, exact centering of the insert can be made possible.

In a specific refinement of the method, the joint has a rectangular (in general: tetragonal) shape and has four joint segments, wherein in each case two mutually adjoining joint segments are oriented preferably perpendicular to one another. It is preferable for at least one, more preferably precisely two, spacers to be inserted into each joint segment. Here, it is particularly preferable if in each case two spacers (before a displacement thereof) are inserted into in each case one corner region of the joint. In this context, a corner region is to be understood in particular as such where the respective "region" extends (proceeding from a particular corner) over less than 30% (in particular less than 15%) of the joint segment adjoining the corner. Exact positioning of the first and second parts is achieved by way of such an arrangement of the spacers in the joint segments. At the same time, the outlay for the method is low, and the speed is high.

The nozzle element preferably maintains its orientation as it passes through a joint (or as it moves along the joint). The orientation of the nozzle element is to be understood in particular to mean the angular orientation thereof with respect to a fixed coordinate system (defined for example by length, width and height of a frame). The nozzle element thus in particular does not change its orientation when it reaches a joint corner and passes through said joint corner. This is similar, for example, to a person who takes four steps forward and then four steps to the side, and continues to face in the same direction. In any case, by virtue of the orientation of the nozzle element being maintained in this way, a fast movement thereof is made possible even in a corner region. The method is further expedited in a simple manner in this way.

It is preferable if, at a joint corner, at least one of the surface sections, adjoining the joint corner at the inner side, of the first or second part is covered by a covering, in particular a tape (adhesive tape). During the movement of the nozzle element, the surface section provided with a covering is preferably that surface section which is passed through at a relatively late point in time when the nozzle element passes through the corner region. Through the provision of such a covering, it is possible for any adhesive and/or sealant adhering to the nozzle to be wiped off. Altogether, it suffices for only those surface sections which will be passed through at a relatively late point in time to be provided with a covering. It is thus not necessary for all of the surface sections adjacent to the joints to be provided with a covering. Altogether, by means of this measure, cleaner working can be made possible, such that a further method step of removing smeared sealant and/or adhesive residues can be eliminated, or the removal is reduced to the removal of the previously arranged covering (in particular the previously arranged tape), which takes only a few seconds.

The adhesive and/or sealant that is used preferably has a viscosity (in the initial state, during the dispensing from the outlet nozzle, for example at 23° C.) such that the forces (shear forces) acting on the joint after the filling of the joint can be compensated (that is to say the joint width and the orientation of the parts in the region of the introduction of the adhesive and/or sealant do not change). The viscosity preferably has (at 23° C.) a value of at least $10^3$, more preferably at least $10^4$, even more preferably at least $10^5$ mPa*s. By means of such an adhesive and/or sealant, the method can be further expedited, and the number of spacers can possibly be reduced.

The above-stated object is furthermore achieved through the use of a spacer having a run-on bevel for setting the spacing of a joint between two parts, in particular between an insert and a frame, for the filling of the joint with an adhesive and/or sealant. Through the use of a spacer of said type, it is possible for said spacer to be lifted out (virtually automatically) in a particularly simple manner when a joint end or a joint corner is reached. In this way, the method does not need to be interrupted for removal of the spacer.

The above-stated object is furthermore achieved by way of a system for filling a joint with a sealant and/or adhesive, in particular in accordance with the method as described above and/or for the use as described above, comprising:

a movable nozzle element with an outlet opening;

a movable spacer, and a run-on bevel for lifting the spacer when a joint end or a joint corner is reached.

A core concept of this aspect lies in the run-on bevel for lifting the spacer. The run-on bevel is designed such that, when the joint end or the joint corner is reached, the spacer is removed from the joint (or lifted out of the joint) (as a result of said spacer running against the joint end or the joint corner). In this respect, not any arbitrary oblique surface is suitable. The run-on bevel must rather be adapted such that the spacer is lifted (owing to its relative movement in relation to the joint end or the joint corner). For example, the spacer of WO 97/03270 A1 is not suitable for this purpose.

With a system of said type, the spacer can be removed from the joint particularly easily, which expedites the method through simple means.

The spacer preferably has the run-on bevel. The run-on bevel is more preferably formed by a convex section (for example a convex rib, for example on the underside of the spacer).

The system preferably furthermore comprises an adhesive and/or sealant, which has a viscosity of at least $10^3$, more preferably at least $10^4$, even more preferably at least $10^5$ mPa*s. By means of such a (highly viscous) adhesive, it is made possible for a filled joint to be stabilized by way of the adhesive or sealant itself.

The above-stated object is furthermore achieved by way of a spacer for a method for filling a joint with an adhesive and/or sealant, in particular for the method of the type described above, and/or for the use of the above-described type and/or the system of the above-described type, wherein the spacer has a run-on bevel such that the spacer is lifted upward when it abuts against an edge.

A central concept with regard to the spacer lies in the fact that the run-on bevel of the spacer is formed and provided such that the spacer is lifted upward, and thereby removed, when it abuts against an edge (of a joint end or of a joint corner). The spacer is thus designed such that (exclusively) the relative movement between spacer and the edge ensures that the spacer is lifted upward. Thus, additional measures for lifting the spacer are not required (and are also not provided). The spacers known from the prior art (for example as per WO 97/03270 A1) are not suitable for realizing such (automatic) lifting. By means of such (automatic) lifting, however, a spacer is provided which makes it possible to realize a considerably simplified method for filling a joint. With regard to the advantages, reference is also made to the above statements relating to the use and to the system. The spacer preferably has a cuboidal main body. Alternatively or in addition, the spacer may have a (preferably convex) rib which forms the run-on bevel. In a specific embodiment, said rib is arranged on one of the cuboid surfaces (for example the underside of the cuboid). By means of a rib of said type, the spacer can slide in a joint particularly easily. At the same time, the rib is utilized for the lifting of the spacer out of the joint. Altogether, in this way, the filling of a joint can be performed in a simple, fast and precise manner.

A central concept of the present invention thus lies in the equipping of a joint between two parts (in particular an insert and a frame) with spacers, wherein, during the introduction of the sealant and/or adhesive by way of the nozzle element, the spacer is displaced together with the nozzle element along the joint, until, at the end of the joint or at a corner of the joint, said spacer is lifted out of said joint. To permit this lifting-out action, the joint (for example a frame which forms the joint base) may have a ramp. Such a ramp (run-on point) may also be arranged outside the joint, or even outside a frame (for example on or in an auxiliary frame). Such a ramp may be spring-mounted or may comprise a spring, for example such that, firstly, the spacer can slide out and the ramp (run-on point) can be pushed downward by the nozzle element. It would basically also be possible for the spacer to be removed by way of a separate device (machine) (for example by way of a gripping action or the like).

Alternatively (preferably), the spacer has a bevel (on its underside). Altogether, it is achieved in this way that an active removal of the spacer is omitted. As a result of the displacement of the spacer along the joint, a consistent width of the joint is ensured. The spacer is preferably a block (wooden block).

Further embodiments will emerge.

BRIEF DESCRIPTION OF THE DRAWINGS

Below, the invention will be described with regard also to further features and advantages and on the basis of an exemplary embodiment, which will be discussed in more detail on the basis of the figures.

In the figures:

FIG. 1 shows a view from above of an insert and a frame, and a system for introducing adhesive and/or sealant into a joint;

FIG. 2 shows the arrangement as per FIG. 1 along the section line II-II in FIG. 1;

WAY OF IMPLEMENTING THE INVENTION

Figure 3:
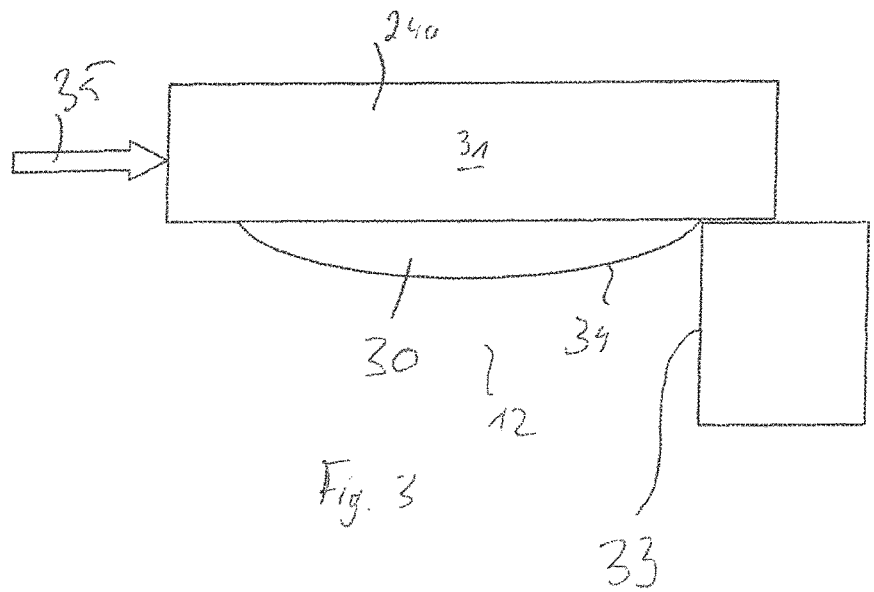
FIG. 3 shows a spacer with a detail of a joint wall.

In the following description, identical parts, and parts of identical action, will be denoted by the same reference designations.

The schematic FIGS. 1 and 2 show a frame 10 and an insert 11 (for example glass pane) arranged within the frame 10. Between the frame 10 and insert 11 there is situated a (rectangular) joint 12 with joint segments 13, 14, 15 and 16, which each define a straight section of the joint 12. A joint base 17 (see FIG. 2) is defined by the frame 10. Furthermore, the frame 10 defines a first joint wall 18. A second joint wall 19 is defined partially by the frame 10 and by an outer edge 20 of the insert 11. The projection 21 that runs on the frame 10 at the inside serves firstly as a support for the insert 11 and secondly as a sealing element for preventing adhesive or sealant from running under the insert 11. Altogether, the joint 12 has an L-shaped cross section (cf. FIG. 2).

A sealant and/or adhesive 22 is introduced into the joint 12 by way of a nozzle element 23. Spacers 24a to 24h are arranged in the joint 12. Here, the spacers 24b to 24h are in a starting position, that is to say in a position before the adhesive is introduced. The first spacer 24a has already been displaced (upward in FIG. 1) in the direction of an arrow 25 by the nozzle element 23. The arrow 25 indicates the present direction of movement of the nozzle element 23. Altogether, in the present example, the nozzle 25 passes firstly through the joint segment 13, then the joint segment 14, then the joint segment 15, and finally the joint segment 16, before arriving at the first joint segment 13 again. When the nozzle element 23 arrives, together with the spacers 24a to 24h arranged in a respective joint segment 13, 14, 15 and 16, at the respectively next corner, said spacers are pushed out at the corner 26. Thus, when the nozzle element 23 moves once through the entire joint 12, all (eight) of the spacers 24a to 24h are successively removed. In the starting position of the spacers 24a to 24h (in FIG. 1, only the spacers 24b to 24h are situated in the starting position), said spacers are situated in a respective corner region 27. A corner region (to which the spacers 24b and 24c are assigned) is denoted by way of example by the dashed line 28. The (respective) corner region 28 extends, for example, over 30% of the associated joint segments. It is then the case that in each case two spacers 24b, 24c are arranged (in their starting position) within said corner region 28. Furthermore, in the corner region 28 or on surface sections 29 adjoining the corners 26, there may be arranged adhesive tapes (not shown in the figures). The adhesive tapes are preferably arranged only in surface sections 29 which adjoin a joint corner 26 (within a corner region 28) and which, as the respective corner region 28 is passed through by the nozzle element 23, are passed through only after the nozzle 23 has changed direction. The adhesive tapes (not shown) may for example have a width of at least 2 cm or at least 3 cm. An upper limit for the width may for example be at most 10 cm or at most 7 cm. Instead of adhesive tapes, it is also possible for the covering of said surface sections 29 to be realized in some other way (which may likewise exhibit the above-stated dimensions).

Figure 4:
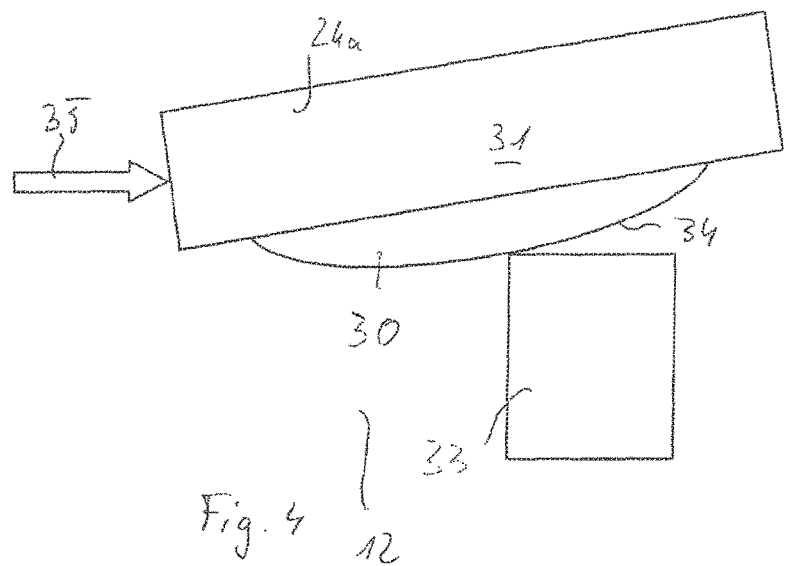
FIG. 4 shows the spacer and the detail of a joint wall in a relative position which differs from that in FIG. 3.

The geometrical design of the spacers 24a to 24h can be seen in particular from FIG. 2 (on the right) and FIGS. 3 and 4. As can be seen in FIG. 2, each spacer comprises a rib 30 which slides within the joint 12. The rib 30 is situated on a side of the spacer 24a to 24h which faces toward the joint 12. Owing to the rib-like projection 30, the spacers 24a to 24h slide in the joint 12 with particularly low friction and in a particularly effective manner. Aside from the rib 30, the spacers 24a to 24h have a cuboidal main body 31 which, during the movement, slides not within the joint but rather above the joint, along joint edges 32 defined by insert 11 and frame 10.

By way of example, the spacer 24a in FIG. 3 is illustrated in a side view together with a section of a joint wall 33. As can be seen from FIG. 3, the rib 30 is preferably of convex form, and thereby defines a run-on bevel 34. Instead of a convex form, a triangular form or some other geometry would alternatively also be conceivable, as long as a run-on bevel 34 is provided. FIG. 3 shows the position of the spacer 24a at the time at which the joint wall 33 is reached (see also the top left in FIG. 1). An arrow 35 (see FIGS. 3 and 4) indicates the present direction of movement of the spacer 24a. In FIG. 4, the spacer 24a can be seen a short time after the position in FIG. 3. As can be seen, owing to the design of the run-on point 34, the spacer 24a has been lifted out of the joint 12, such that the spacer 24a is removed (virtually automatically) from the joint.

At this juncture, it is pointed out that all of the above-described parts individually and in combination, in particular the details illustrated in the drawings, are claimed as being essential to the invention. Modifications to these are familiar to a person skilled in the art.

LIST OF REFERENCE DESIGNATIONS

10 Frame
11 Insert
12 Joint
13 Joint segment
14 Joint segment
15 Joint segment
16 Joint segment
17 Joint base
18 First joint wall
19 Second joint wall
20 Outer edge
21 Projection
22 Sealant and/or adhesive
23 Nozzle element
24a Spacer
24b Spacer
24c Spacer
24d Spacer
24e Spacer
24f Spacer
24g Spacer
24h Spacer
25 Arrow
26 Corner
27 Corner region
28 Dashed line
29 Surface section
30 Rib
31 Main body
32 Joint edge
33 Joint wall
34 Run-on bevel
35 Arrow

The invention claimed is:

1. A method for filling a joint with an adhesive and/or sealant, comprising:
   a) positioning a first part, and a second part, such that the first and second parts form the joint;
   b) inserting a movable spacer into the joint;
   c) positioning a nozzle element over the joint;
   d) displacing the nozzle element along the joint such that the nozzle element abuts against the spacer and moves the spacer; and
   e) discharging adhesive and/or sealant out of an outlet nozzle of the nozzle element during step d), wherein:
      the spacer is removed from the joint when a joint end or a joint corner is reached, and
      the spacer has a run-on bevel such that said spacer is lifted out when the spacer is further moved after the spacer initially abuts against the joint end or the joint corner; and/or a run-on bevel is provided at the joint end or at the joint corner such that the spacer is lifted out when the spacer is further moved after the spacer initially runs against the joint end or the joint corner.

2. The method as claimed in claim 1,
   wherein multiple movable spacers are inserted into the joint, and
   wherein at least some of the multiple movable spacers are moved simultaneously by the nozzle element.

3. The method as claimed in claim 1,
   wherein the joint comprises multiple joint segments which have an angle with respect to one another, and at least one movable spacer is inserted into each joint segment.

4. The method as claimed in claim 1,
   wherein multiple movable spacers are inserted into the joint,
   wherein the joint has a rectangular shape and has four joint segments,
   wherein two mutually adjoining joint segments are oriented perpendicular to one another,
   wherein at least one spacer is mounted in each joint segment, and
   wherein, two spacers, before a displacement thereof, are inserted into one corner region of the joint formed by two mutually adjoining joint segments.

5. The method as claimed in claim 1,
wherein an orientation of the nozzle element is maintained as the nozzle element passes through the joint corner.

6. The method as claimed in claim 1,
wherein at the joint corner, at least one surface section adjoining the joint corner of the first or second part is covered by a covering.

7. The method as claimed in claim 1,
wherein the adhesive and/or sealant, in an initial state, during dispensing from the outlet nozzle, has a viscosity such that relative forces arising between the first part and the second part are compensated by the adhesive and/or sealant, wherein the adhesive and/or sealant has a viscosity of greater than or equal to $10^3$ mPa*s.

8. The method as claimed in claim 1,
wherein the movable spacer has a run-on bevel for setting a width of the joint between a frame as the first part and an insert as the second part, for the filling of the joint with an adhesive and/or sealant.

9. The method as claimed in claim 1,
wherein multiple movable spacers are inserted into the joint,
wherein the joint has a rectangular shape and has four joint segments,
wherein two mutually adjoining joint segments are oriented perpendicular to one another,
wherein two spacers are mounted in each joint segment, and
wherein, two spacers, before a displacement thereof, are inserted into one corner region of the joint formed by two mutually adjoining joint segments.

10. The method as claimed in claim 1,
wherein the adhesive and/or sealant, in an initial state, during dispensing from the outlet nozzle, has a viscosity such that relative forces arising between the first part and the second part are compensated by the adhesive and/or sealant, wherein the adhesive and/or sealant has a viscosity of greater than or equal to $10^4$ mPa*s.

11. The method as claimed in claim 1,
wherein the adhesive and/or sealant, in an initial state, during dispensing from the outlet nozzle, has a viscosity such that relative forces arising between the first part and the second part are compensated by the adhesive and/or sealant, wherein the adhesive and/or sealant has a viscosity of greater than or equal to $10^5$ mPa*s.

* * * * *